United States Patent

Ichishi et al.

[11] Patent Number: 5,862,674
[45] Date of Patent: Jan. 26, 1999

[54] DETECTING DEVICE FOR VEHICLE FOR DETECTING TEMPERATURE IN PASSENGER COMPARTMENT AND ARRANGEMENT STRUCTURE THEREOF

[75] Inventors: Yoshinori Ichishi, Kariya; Yuji Ito, Okazaki, both of Japan

[73] Assignee: Denso Corporation, Kariya, Japan

[21] Appl. No.: 984,088

[22] Filed: Dec. 3, 1997

[30] Foreign Application Priority Data

Dec. 4, 1996 [JP] Japan .................................... 8-324273

[51] Int. Cl.⁶ ...................................................... F25D 17/04
[52] U.S. Cl. ........................... 62/186; 62/244; 62/259.2; 62/407; 62/DIG. 16
[58] Field of Search ............................. 62/177, 186, 244, 62/259.1–259.2, 263, 407, 411, DIG. 16

[56] References Cited

U.S. PATENT DOCUMENTS

| | | | |
|---|---|---|---|
| 2,151,097 | 3/1939 | Germonprez | 62/244 X |
| 2,714,808 | 8/1955 | Owen et al. | 62/244 X |
| 3,585,812 | 6/1971 | Parker | 62/186 X |
| 4,432,213 | 2/1984 | Katahira et al. | 62/244 X |
| 5,054,378 | 10/1991 | Speece | 62/244 X |
| 5,116,280 | 5/1992 | Kloster | 62/244 X |
| 5,307,645 | 5/1994 | Pannell | 62/244 |
| 5,669,813 | 9/1997 | Jairazbhoy et al. | 62/259.2 X |

FOREIGN PATENT DOCUMENTS

U-59-23636  2/1984  Japan .

*Primary Examiner*—Henry Bennett
*Assistant Examiner*—Susanne C. Tinker
*Attorney, Agent, or Firm*—Harness, Dickey & Pierce, PLC

[57] ABSTRACT

A detecting device for a vehicle includes an inside air temperature sensor for an air conditioning system. The air conditioning system includes an air duct having a horizontal duct, and the horizontal duct is disposed in a receiving passage of a ceiling of the vehicle. The horizontal duct includes a connection duct portion having a U-shaped bottom wall portion. The inside air temperature sensor is disposed in the U-shaped bottom wall portion at a position proximate to an opening portion of an inner wall of a passenger compartment of the vehicle, and a suction cover is attached to the opening portion of the inner wall of the passenger compartment. Thus, the inside air temperature sensor accurately detects a temperature of inside air in the passenger compartment without being affected by an amount of sunlight entering the passenger compartment or the other conditions.

17 Claims, 6 Drawing Sheets

DETECTING DEVICE FOR VEHICLE FOR DETECTING TEMPERATURE IN PASSENGER COMPARTMENT AND ARRANGEMENT STRUCTURE THEREOF

CROSS-REFERENCE TO RELATED APPLICATION

This application is related to and claims priority from Japanese Patent Application No. Hei. 8-324273 filed on Dec. 4, 1996, the contents of which are hereby incorporated by reference.

BACKGROUND OF THE INVENTION

1. Field of the Invention

The present invention relates to a detecting device for a vehicle for accurately detecting a temperature in a passenger compartment of the vehicle without being affected by an amount of sunlight entering the passenger compartment or other conditions.

2. Description of Related Art

Conventionally, a various kinds of temperature sensors are used for an air conditioner for a vehicle. The temperature sensors include an inside air temperature sensor for detecting an inside air temperature at a rear seat side of a passenger compartment of the vehicle. However, the inside air temperature sensor is generally attached to a ceiling in the passenger compartment to detect the inside air temperature of the passenger compartment. Therefore, when a temperature on the ceiling of the vehicle becomes high, the inside air temperature sensor is affected by the temperature of the ceiling so that the inside air temperature at the rear seat side cannot be accurately detected.

To overcome such a problem, an inside air temperature sensor is proposed as described in JP-U-59-23636. In the inside air temperature sensor, a heat-insulating layer is placed between an outer plate of a vehicle and an inner wall of a passenger compartment of the vehicle, and the inside air temperature sensor is held within a sensor case which protrudes from an opening portion of the inside wall of the passenger compartment. Further, a heat-receiving plate is provided on a lower surface of the sensor case and draft holes are formed along the heat-receiving plate.

However, when an intensity of sunlight becomes high, the temperature on the ceiling may be increased to a temperature more than 50° C. Therefore, even when the heat-insulating layer and the heat-receiving plate are provided, a temperature around the inside air temperature sensor is increased. As a result, an error may be caused in the temperature detected by the inside air temperature sensor.

SUMMARY OF THE INVENTION

In view of the foregoing problems, it is an object of the present invention to provide an arrangement structure of a sensor, for accurately detecting a temperature in the passenger compartment without being affected by an amount of sunlight entering the passenger compartment or other conditions.

It is an another object of the present invention to provide a detecting device having a sensor for a vehicle, the detecting device accurately detects a temperature in the passenger compartment without being affected by an amount of sunlight entering the passenger compartment or other conditions.

According to a first aspect of the present invention, an arrangement structure of a sensor includes an air duct disposed in a space between an outer plate of the vehicle and an inner wall of the passenger compartment. The air duct is disposed in the space to form a gap between the inner wall of the passenger compartment and the air duct, and the sensor is disposed in the gap to detect the physical amount in the passenger compartment through a communication portion provided in the inner wall of the passenger compartment. Therefore, heat transmitted from the outer plate to the sensor is sufficiently interrupted by using the air duct even when an intensity of sunlight becomes high in the summer. Thus, the sensor accurately detects a physical amount in the passenger compartment without being affected by an amount of sunlight entering the passenger compartment.

Further, the arrangement structure of the sensor includes a first heat-insulating member disposed between the outer plate and the air duct and a second heat-insulating member disposed between the inner wall of the passenger compartment and the duct. Thus, the sensor further accurately detects a physical amount in the passenger compartment.

Preferably, the air duct includes a main air passage through which air mainly flows and a branch air passage branched from the main air passage at a side of the gap to form a negative pressure in the branch air passage relative to a main air passage. Because the negative pressure is generated in the branch air passage, air in the passenger compartment readily flows around the sensor and readily flows into the branch air passage. Thus, the sensor accurately smoothly detects the physical amount in the passenger compartment.

More preferably, the arrangement structure includes a communication member for communicating the gap with the branch air passage, the sensor is disposed in the gap at a position proximate to a first opened end of the communication member, and a check valve is disposed at a second end of the communication member. Therefore, a reverse flow of air from the branch air passage to the gap can be prevented. As a result, air further smoothly flows from the passenger compartment into the branch air passage through the communication portion and the communication member.

Still more preferably, the sensor is a temperature sensor for detecting a temperature in the passenger compartment, and the arrangement structure of the sensor further includes: a cooling unit for cooling air to be introduced into the air duct; target temperature control means for controlling a target temperature of air to be blown out from the air duct to the passenger compartment; and temperature correction means for correcting a temperature detected by the temperature sensor according to the target temperature of air to have a correction amount. Thus, the temperature sensor accurately detects a temperature in the passenger compartment while suppressing an inference due to the target temperature of air. As a result, the sensor accurately detects a temperature in the passenger compartment without being affected by other conditions.

According to a second aspect of the present invention, a detecting device includes: an air duct disposed in a space between an outer plate of the vehicle and an inner wall of the passenger compartment, and a physical amount detecting sensor for detecting a physical amount in the passenger compartment. The air duct is disposed in the space to form a gap between the inner wall of the passenger compartment and the air duct, and the physical amount detecting sensor is disposed in the gap to detect the physical amount in the passenger compartment through a communication portion provided in the inner wall of the passenger compartment. Therefore, heat transmitted from the outer plate of the vehicle to the sensor is sufficiently interrupted by using the air duct even when an intensity of sunlight becomes high in the summer. Thus, the detecting device accurately detects the physical amount in the passenger compartment without being affected by an amount of sunlight entering the passenger compartment.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
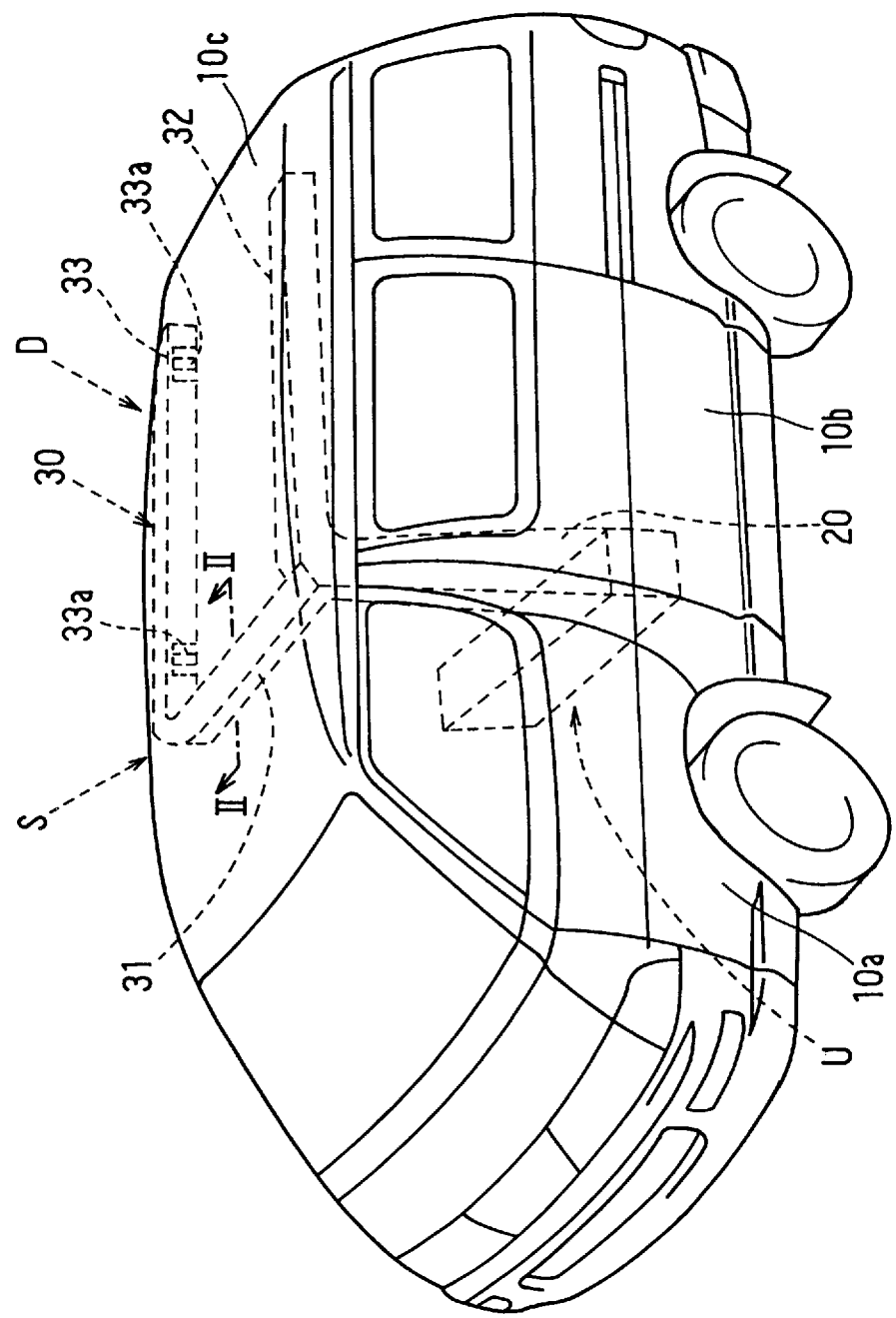
FIG. 1 is a schematic perspective view showing an air conditioning system having an air duct in one box car according to a first preferred embodiment of the present invention.

A first preferred embodiment of the present invention will be now described. As shown in FIG. 1, the first embodiment of the present invention is applied to a vehicle (i.e., one box car), and the vehicle includes an air conditioning system S. The air conditioning system S includes an air conditioning unit U and an air duct D. The air conditioning unit U is disposed near a boundary between a front door 10a and a rear door 10b under a floor of a passenger compartment of the vehicle.

The air conditioning unit U is for introducing air toward the passenger compartment by a blower, the air is cooled by an evaporator and the cooled air is blown into the air duct D. The blower and the evaporator are disposed within the air conditioning unit U.

Figure 2:
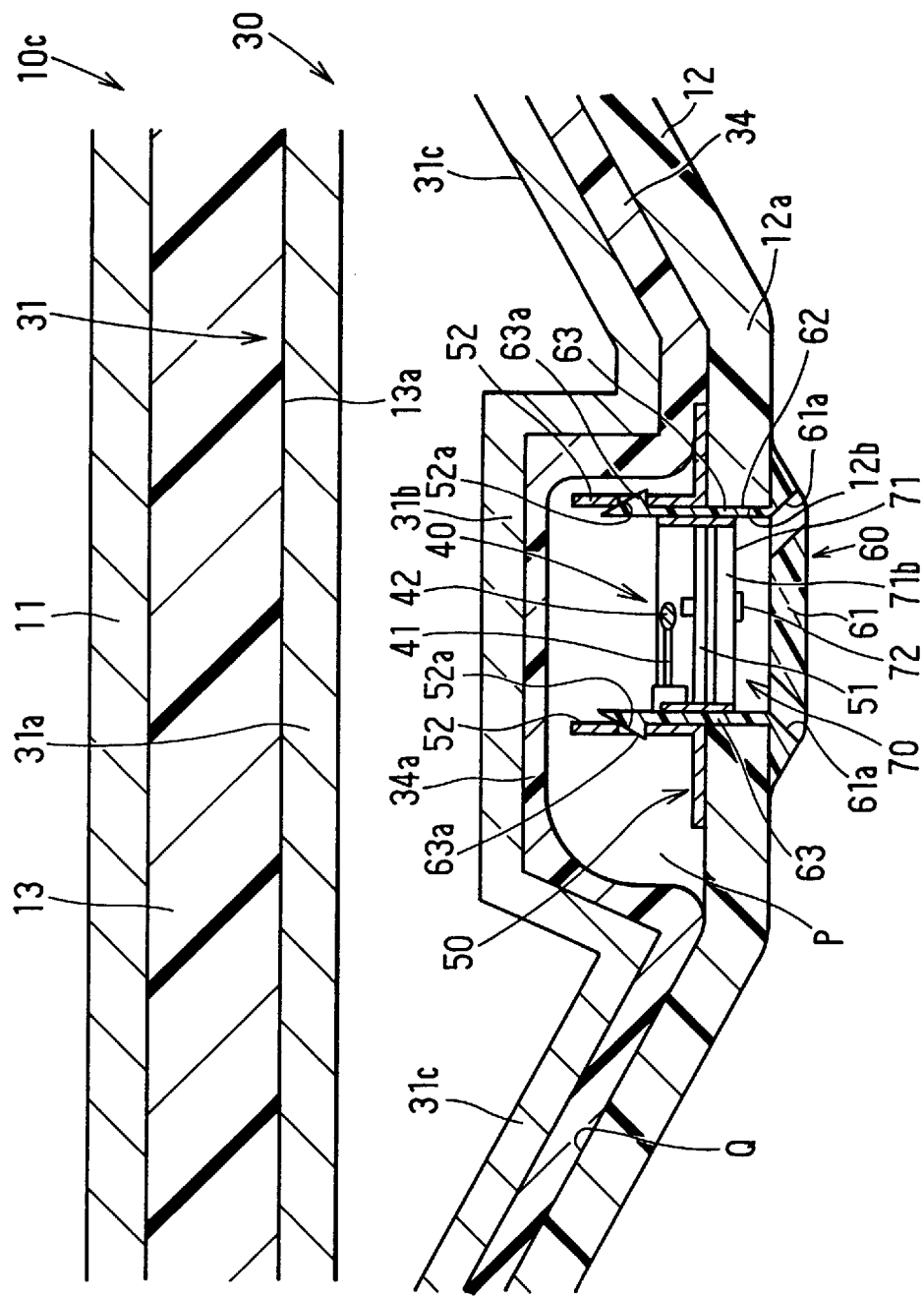
FIG. 2 is an enlarged partial cross-sectional view taken along line II—II in FIG. 1.

The air duct D is disposed at a rear side of the vehicle, and includes a vertical duct 20 and a horizontal duct 30. The air duct D is made of heat-insulating resin material and is formed approximately in a trapeziform shape in a cross-section as shown in FIG. 2. The cross-section of the air duct D is not limited to the approximate trapeziform shape; however, may be formed in the other shape such as a rectangular shape.

The vertical duct 20 is formed at the boundary between the front door 10a and the rear door 10b, and is stood from the air conditioning unit U toward the horizontal duct to pass within a left side wall portion of the passenger compartment. Cool air from the air conditioning unit U is supplied to the horizontal duct 30 through the vertical duct 20.

The horizontal duct 30 is provided within a receiving passage Q (see FIG. 2) of a ceiling 10c of the passenger compartment (i.e., the ceiling 10c of the vehicle), and is formed by connecting a connection duct portion 31 and left and right blowing side duct portions 32 and 33 in a U shape as shown in FIG. 1.

As shown in FIG. 2, the ceiling 10c of the vehicle includes an outer plate 11 made of metal and an inner wall 12 made of heat-insulating resin material, and a heat-insulating layer 13 is interposed between the outer plate 11 and the inner wall 12. A protrusion wall 12a is formed in an approximate trapeziform shape in the inner wall 12 at a position corresponding to the horizontal duct 30, and protrudes toward the passenger compartment to be separated from a lower surface 13a of the heat-insulating layer 13. Therefore, between the protrusion wall 12a of the inner wall 12 and the lower surface 13a of the heat-insulating layer 13, the receiving passage Q is horizontally formed in a U shape similar to the horizontal duct 30. Thus, the connection duct portion 31 and the left and right blowing side duct portions 32 and 33 are received in each position of the receiving passage Q, corresponding to those parts.

The connection duct portion 31 extends horizontally from the vertical duct 20 in the left-right direction of the vehicle, and cool air is supplied from the vertical duct 20 into the right side duct portion 33 through the connection duct portion 31. As shown in FIG. 2, an upper wall 31a of the connection duct portion 31 contacts the lower surface 13a of the heat-insulating layer 13.

The right side duct portion 33 extends from a right end portion of the connection duct portion 31 toward the rear side of the vehicle and has two face air outlets 33a. Therefore, cool air is blown out from the face air outlets 33a toward a rear seat at the right side of the passenger compartment.

The left side duct portion 32 extends from a left end portion of the connection duct portion 31 toward the rear side of the vehicle and has two face air outlets (not shown). Therefore, cool air is blown out from the face air outlets e toward a rear seat at the left side of the passenger compartment.

Similarly to the connection duct portion 31, the other portions of the horizontal duct 30 contact the lower surface 13a of the heat-insulating layer 13 in the receiving passage Q. As shown in FIG. 2, the air conditioning system S further includes a rear side inside air temperature sensor 40, and the inside air temperature sensor 40 is provided in the ceiling 10c of the vehicle.

As shown in FIG. 2, a bottom wall 31b of the connection duct portion 31 is formed approximately in a U shape, a heat-insulating layer 34 made of heat-insulating resin material is formed along lower surfaces of the bottom wall 31b and two inclined walls 31c between the protrusion wall 12a of the inner wall 12 and the bottom wall 31b and the two inclined walls 31c of the connection duct portion 31 and the inner wall 12. Along the bottom wall 31b of the connection duct portion, a layer portion 34a of the heat-insulating layer 34 is provided to form therebetween a passage P having approximately a rectangular shape in cross-section.

Figure 3:
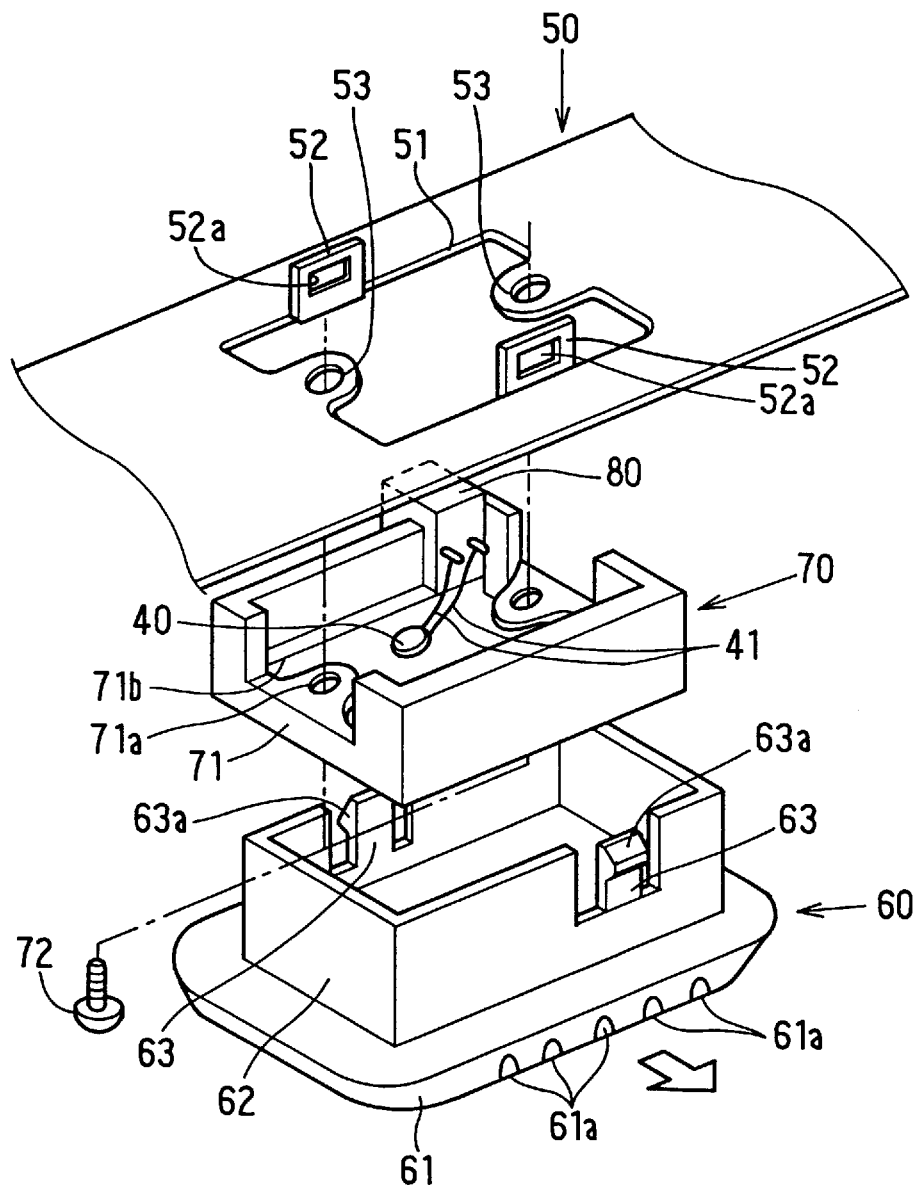
FIG. 3 is an exploded perspective view showing a detecting device having an inside air temperature sensor disposed in the duct.

A plate-like bracket 50 made of iron is received within the passage P, and two end portions of the bracket 50 in a longitudinal direction is fixed to two ends of the receiving passage Q. Further, as shown in FIGS. 2 and 3, an opening portion 51 is formed at a center portion in a longitudinal direction of the bracket 50, and plate-like protrusions 52 of the bracket 50 extend toward the bottom wall 31b of the connection duct portion 31. On the other hand, at left and right peripheral portions of the opening portion 51, placed in the left-right direction of the vehicle, female screw hole portions 53 are formed to extend within the opening portion 51.

A box-shaped suction cover 60 made of elastic resin material is fitted into an opening portion 12b formed in the protrusion wall 12a of the inner wall 12 of the passenger compartment. The suction cover 60 includes a cover portion 61 and a box portion 62 extending from the cover portion 61. The cover portion 61 contacts the protrusion portion 12a from a side of the passenger compartment to close the opening portion 12b of the inner wall 12. As shown in FIGS. 2 and 3, a plurality of draft holes 61a are formed in the cover portion 61. An inner portion of the box portion 62 is communicated with an upper space between the left and right rear seats at a front side of the passenger compartment through the draft holes 61a.

The box portion 62 of the suction cover 60 is inserted into the opening portion 51 through the opening portion 12b, and engagement portions 63 are formed respectively at center portions of front and rear walls of the box portion 62 as shown in FIG. 3. Each engagement portion 63 has a craw portion 63a, and each craw portion 63a is inserted into each engagement hole portion 52a formed in each protrusion portion 52 of the opening portion 51.

A sensor case 70 is received in the box portion 62 of the suction cover 60 and has a bottom wall 71. Two through holes 71a are formed in the bottom wall 71, and each male screw 72 is inserted into each through hole 71 and is tightly screwed into each female screw hole portion 53 of the bracket 50. Further, an opening portion 71b is formed in the bottom wall 71, and an inner portion of the sensor case 70 is communicated with a rear side space within the passenger compartment through the opening portion 71b and the draft holes 61a of the cover portion 61.

Further, the inside air temperature sensor 40 includes two lead lines 41, and the lead lines 41 are brazed to a connector 80 fitted to the front wall of the sensor case 70. Thus, the inside air temperature sensor 40 detects a temperature of air flowing from an upper space of the left and right rear seats at a front side within the passenger compartment into the sensor case 70 through draft holes 61a of the suction cover 60, the inner portion of the box portion 60 and the opening portion 71a of the sensor case 70.

As shown in FIG. 2, the inside air temperature sensor 40 further includes a sensor portion 42. In the air conditioning unit U, a target temperature of blown air is determined according to an inside air temperature detected by the inside air temperature sensor 40, an outside air temperature of the vehicle, and a setting temperature at a rear seat side in the passenger compartment and the like. The inside air temperature sensor 40 is disposed at a center portion of the connection duct portion 31 of the horizontal duct 30 in the left-right direction to be separated from the bottom wall 31b (i.e., layer portion 34a) of the connection duct portion 31 at the side of the passenger compartment. Therefore, even if a sunlight amount becomes high in the summer so that the temperature on the outer plate 11 becomes high, heat transmitted from the outer plate 11 of the ceiling 10c to the inside air temperature sensor 40 can be sufficiently interrupted by the connection duct portion 31 as compared with a case where the inside air temperature sensor 40 is disposed at a position proximate to the heat-insulating layer 13 without using the connection duct portion 31.

When cool air flows from the air conditioning unit U to the connection duct portion 31, the temperature of air within the connection duct portion 31 is decreased. Further, when cool air flows into the connection duct portion 31 by a cool operation due to the air conditioning apparatus S, a temperature in the sensor case 70 can be maintained in a range of 10° C.–30° C. On the other hand, a control temperature within the passenger compartment is generally in a range of 20° C.–30° C. Thus, the difference between the temperature within the sensor case 70 and the temperature within the passenger compartment can be readily maintained by the heat-insulating layer 34. Thus, a heat-insulating effect of the inside air temperature sensor 40 from the outer plate 11 is further increased. As a result, the inside air temperature sensor 40 accurately detects the temperature in the passenger compartment without being affected by the heat from the ceiling 10c of the vehicle.

Further, because the inside air temperature sensor 40 is disposed at a position proximate to an inner surface of the protrusion wall 12a of the inner wall 12, the inside air temperature sensor 40 accurately detects a temperature of an area proximate to the head portion of a passenger seated on the rear seat in the passenger compartment.

In the winter, cool air may not be supplied to the air duct D, and the temperature in the ceiling 10c is very low as compared with a case in the summer. Therefore, heat transmitted from the outer plate 11 to the inside air temperature sensor 40 is sufficiently interrupted by the heat-insulating layer 34 and the air layer within the connection duct portion 31, and the inside air temperature sensor 40 accurately detects the temperature of inside air within the passenger compartment.

Figure 4:
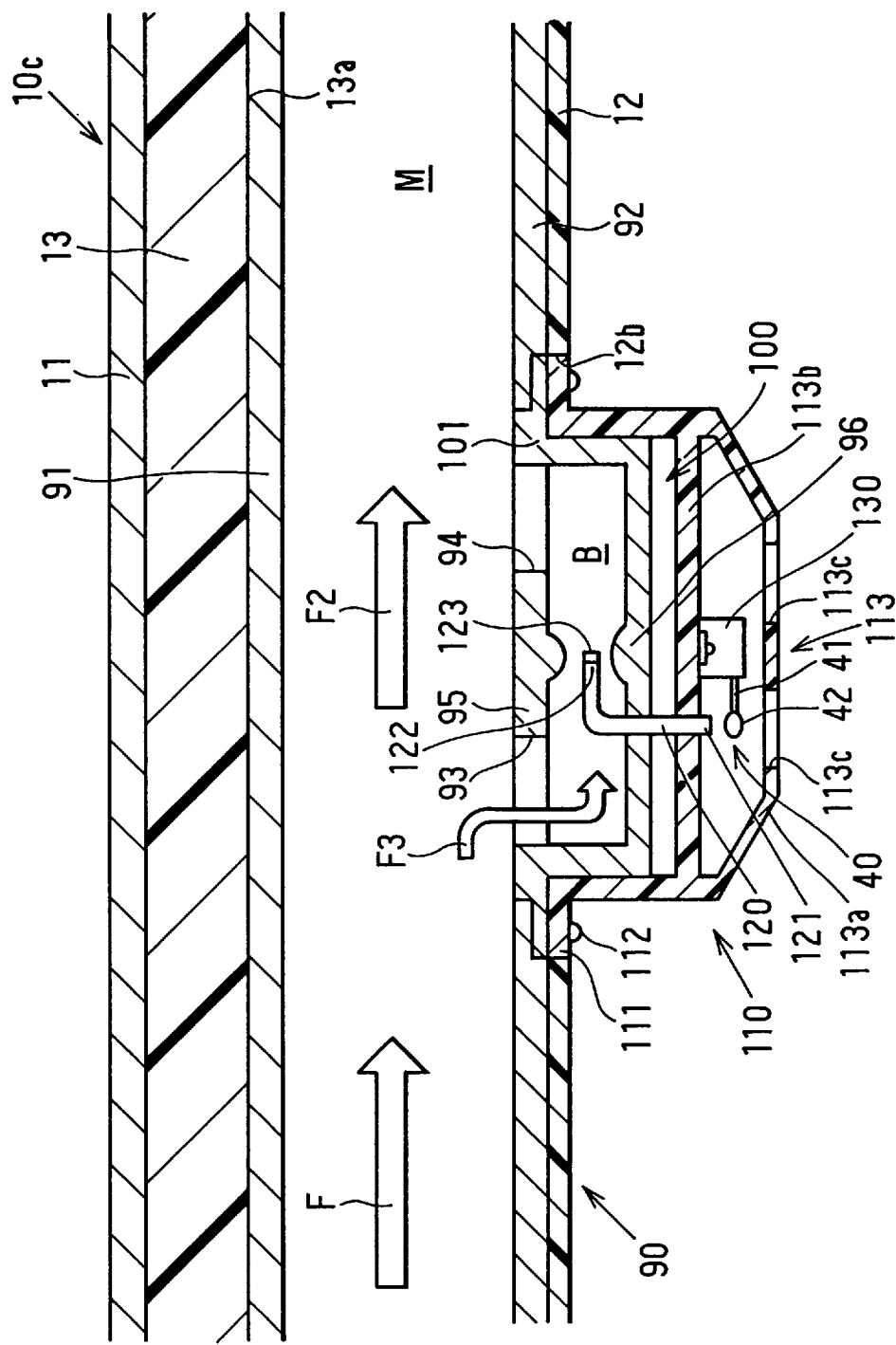
FIG. 4 is a cross-sectional view showing a detecting device having an inside air temperature sensor according to a second preferred embodiment of the present invention.

A second preferred embodiment of the present invention will be now described with reference to FIG. 4.

In the second embodiment, a connection duct portion 90 is used instead of the connection duct portion 31 of the first embodiment, and the connection duct portion 90 is received in the receiving passage Q of the ceiling 10c of the vehicle. Similarly to the connection duct portion 31 in the first embodiment, the connection duct portion 90 has an approximate trapeziform shape in a cross-section, an upper wall 91 of the connection duct portion 90 contacts the lower surface of the heat-insulating layer 13 of the ceiling 10c. Two opening portions 93 and 94 and a partition wall portion 95 partitioning the two opening portions 93 and 94 are formed in a bottom wall 92 of the connection duct portion 90 at a center portion in a longitudinal direction of the connection duct portion 90. The opening portion 93 is placed at an upstream air side of the opening portion 94.

A supplementary wall 100 is provided in the connection duct portion 90 and is formed in a box shape to protrude toward the passenger compartment. The supplementary wall 100 has a circular flange portion 101, and the flange portion 101 is inserted into the two opening portions 93 and 94. Therefore, a branch passage B is formed between the supplementary wall 100 and the partition wall portion 95, relative to a main passage M within the connection duct portion 90. Thus, an air flow F is branched into an air flow F2 flowing through the main passage M and an air flow F3 flowing through the branch passage B.

Within the branch passage B, a circular restriction portion 96 is formed. Therefore, the air flow F3 is restricted in the restriction portion 96 and flows through the opening portion 94 so that a flow rate of the air flow F3 becomes high within the restriction portion 96. Therefore, a negative pressure is generated within the restriction portion 96. Thus, the cross-sectional area of the branch passage B may be made smaller than that of the connection duct portion 90 to generate the negative pressure in the branch passage B, so that the restriction portion 96 may be omitted.

A sensor case 110 is formed in a box shape, and is fitted to the supplementary wall 100 from the side of the passenger compartment. A flange portion 111 of the sensor case 110 is inserted into the opening portion 12b of the inner wall 12 and contacts the flange portion 101 of the supplementary wall 100. The flange portion 111 of the sensor case 110 is air-tightly fixed to an outer periphery of the opening portions 93 and 94 through the flange portion 101 using a plurality of screws 112. Thus, a contacting portion between the supplementary wall 100 and the partition wall 95 is also air-tightly connected to each other. Here, when the sensor case 110 has a function similar to the supplementary wall 100, the supplementary wall 100 may be omitted.

The sensor case 110 includes a sensor receiving portion 113, and the sensor receiving portion 113 has a suction cover portion 113a and a partition wall portion 113b. In the suction cover portion 113a, a plurality of draft holes 13c are formed. Through the draft holes 13c, an inner portion of the sensor receiving portion 113 is communicated with the passenger compartment, that is, an upper space between the left and right rear seats at a front side in the passenger compartment.

A hose 120 is fitted into the partition wall 113b, and an opening end portion 121 of the hose 120 is placed within the sensor receiving portion 113. The hose 120 extends within the branch passage B in a L shape, and another opening portion 122 of the hose 120 is placed within the restriction portion 96. Thus, air within the sensor receiving portion 113 is sucked into the restriction portion 96 through the hose 120 by using the negative pressure within the restriction portion 96.

A lead valve 123 as a check valve is made of a film material, and is fixed to the opening portion 122 of the hose 120 to prevent air from flowing from the branch passage B to the hose 120. Here, the lead valve 123 is used as the check valve; however, the other valves for preventing a reverse flow of air can be used as the check valve. Further, instead of the hose 120, a communication passage may be used.

In the second embodiment, the inside air temperature sensor 40 is disposed within the sensor receiving portion 113 and is fixed to the partition wall portion 113b by a connector 130. The inside air temperature sensor 40 includes the two lead wires 41, and the two lead wires are blazed to the connector 130. The sensor portion 42 of the inside air temperature sensor 40 is disposed at a position proximate to the opening portion 121 of the hose 120 to oppose to the opening portion 121 of the hose 120.

In the second embodiment, when a cool air flows through the connection duct portion 90, a part of the cool air flow through the branch passage B; therefore, the flow rate of the cool air in the branch passage B becomes very high at the restriction portion 96 to generate the negative pressure near the opening portion 122 of the hose 120. Thus, air within the sensor receiving portion 113 is sucked into the hose 120, and air at an upper side of the head portion of a passenger seated on the rear seat of the passenger compartment readily flows into the sensor receiving portion 113. As a result, air within the passenger compartment readily flows around the inside air temperature sensor 40, and the inside air temperature sensor 40 can accurately detect the temperature of air at the upper side of the head portion of the passenger seated on the rear seat without being affected by heat from sunlight and the other conditions.

A third preferred embodiment of the present invention will be now described with reference to FIGS. 5–7.

In the third embodiment, to further improve an accuracy detected by the inside air temperature sensor 40 in the first embodiment, the temperature detected by the inside air temperature sensor 40 is corrected, and the corrected temperature is output as a detected value of the inside air temperature sensor 40. Therefore, in the third embodiment, the inside air temperature sensor 40 further accurately detects the temperature in the passenger compartment without being affected by an amount of sunlight entering the passenger compartment or other conditions.

Figure 5:
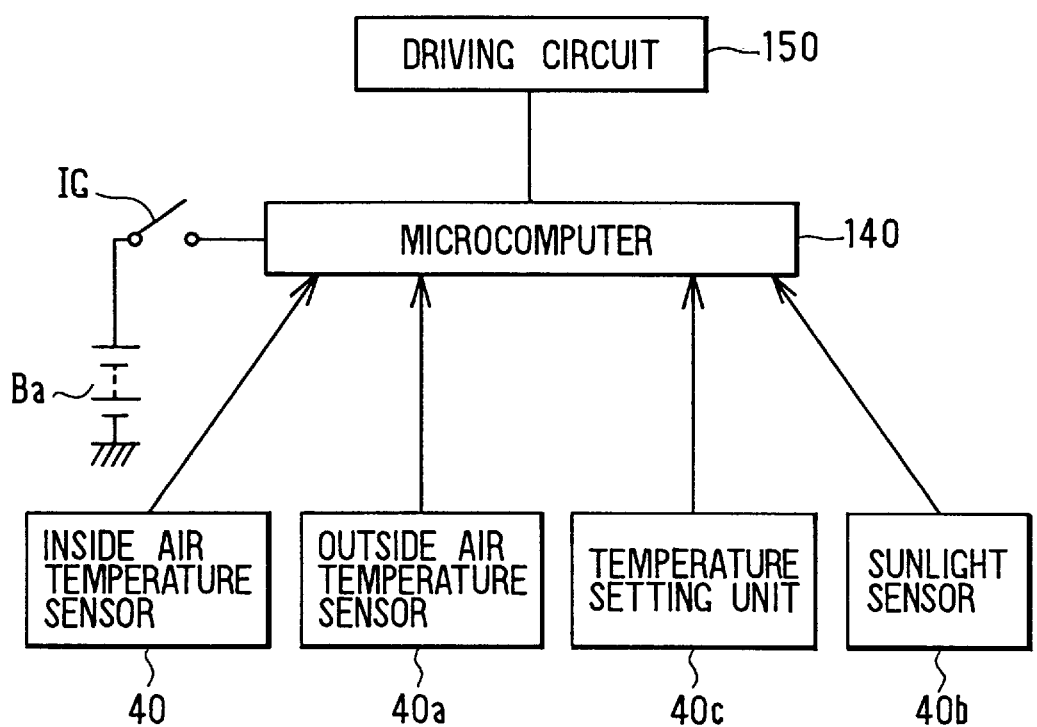
FIG. 5 is a block diagram of a control system of a microcomputer according to a third preferred embodiment of the present invention.
Figure 6:
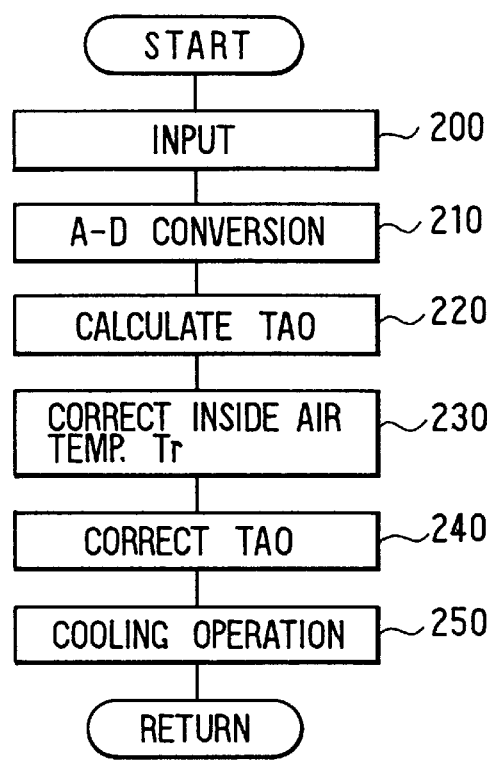
FIG. 6 is a control flowchart of the microcomputer according to the third embodiment.

As shown in FIG. 5, the detecting device further includes a control circuit. The control circuit includes a microcomputer 140, and the microcomputer 140 performs a computer program according to the flowchart shown in FIG. 6. In the microcomputer 140, a cooling operation and a correction precess of the temperature detected by the inside air temperature sensor 40 are performed based on output signals from the inside air temperature sensor 40, an outer side temperature sensor 40a, a sunlight sensor 40b and a temperature setting unit 40c.

An electric power is supplied from a battery Ba to the microcomputer 140 through an ignition switch IG. Further, the computer program is pre-stored in ROM of the microcomputer 140. The outside air temperature sensor 40a detects a temperature of outside air of the vehicle, the sunlight sensor 40b detects an amount of sunlight entering the rear seat side in the passenger compartment, and the temperature setting unit 40c sets a target temperature in a rear seat side of the passenger compartment. A driving circuit 150 is controlled by the microcomputer 140 to drive the blower of the air conditioning unit U described in the first embodiment. The other parts in the third embodiment are similar to those in the first embodiment.

In the third embodiment, when the microcomputer 140 is driven to start the computer program, signals from the inside air temperature sensor 40, the outside air temperature sensor 40a, the sunlight sensor 40b and the temperature setting unit 40c are respectively input to the microcomputer 140 at step 200.

At step 210, the input signals are digitally converted to perform A-D conversion. At this time, a temperature detected by the inside air temperature sensor 40, a temperature detected by the outside air temperature sensor 40a, a sunlight amount detected by the sunlight sensor 40b and a setting temperature set by the temperature setting unit 40c are respectively digitally converted to an inside air temperature Tr, an outside air temperature Tam, a sunlight amount Ts and a setting temperature Tset.

At step 220, a target temperature TAO of air blown from each face air outlet of the two blowing duct portions 32 and 33 is calculated by the following equation (1) pre-stored in the ROM of the microcomputer 140 based on the inside air temperature Tr, the outside air temperature Tam, the sunlight amount Ts and the setting temperature Tset.

$$TAO = K_{set} \times T_{set} - K_r \times T_r - K_{am} \times T_{am} - K_s \times T_s + C \qquad (1)$$

wherein, Kset, Kr, Kam, and Ks are gains for correction, and C is a constant for correction.

Figure 7:
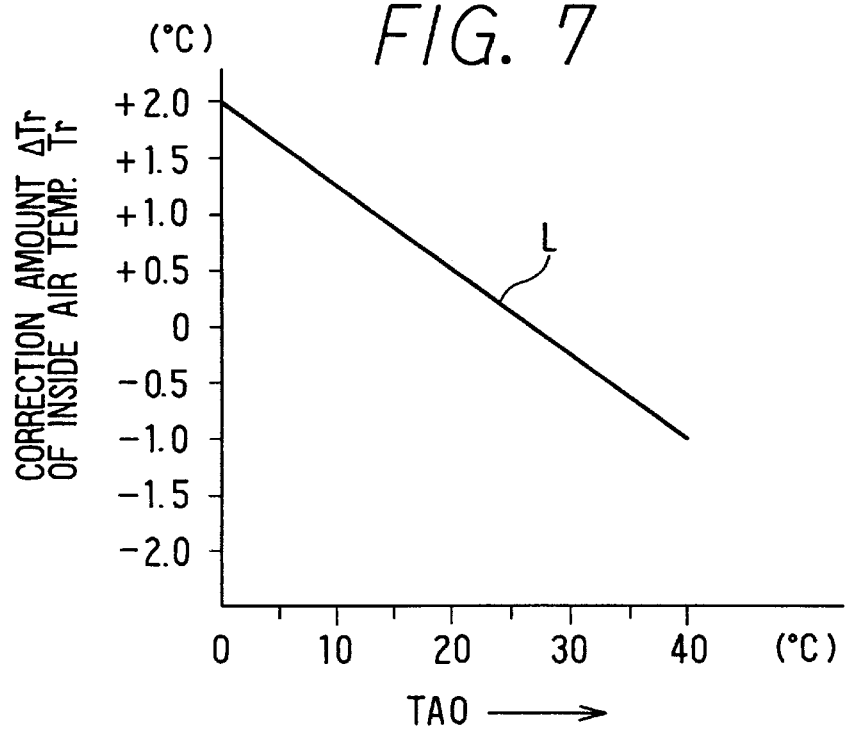
FIG. 7 is a graph showing a relationship between a target blown-air temperature (TAO) and a correction amount (ΔTr) of an inside air temperature (Tr).

At step 230, according to the calculated target temperature TAO, the inside air temperature Tr is corrected by a correction amount $\Delta Tr$ based on a correction date L shown in graph of FIG. 7. That is, the corrected temperature Tra (i.e., $Tr \pm \Delta Tr$) is used as output temperature from the inside air temperature sensor 40. Therefore, the detecting device having the inside air temperature sensor 40 accurately detects the temperature in the passenger compartment while suppressing an influence due to the target temperature TAO of blown air.

In FIG. 7, the correction date L has an inverse proportional relationship between the target temperature TAO and the correction amount ΔTr of the inside air temperature Tr. The correction date L in FIG. 7 is pre-stored in the ROM of the microcomputer 140. However, the target temperature TAO and the correction amount ΔTr of the inside air temperature Tr may be set to a relationship where the correction amount ΔTr is increased at a negative side according to an increase of the target temperature TAO and the correction amount ΔTr is increased at a positive side according to a decrease of the target temperature TAO. Generally, the correction date L is set to suppress an influence on the inside air temperature sensor 40.

After correcting the inside air temperature, a correction value TAOa of the target temperature TAO is calculated by the following equation (2) pre-stored in the ROM of the microcomputer 140 based on the target temperature TAO and the correction amount ΔTr of the inside air temperature Tr.

$$TAOa = TAO \pm Kr \times \Delta Tr \qquad (2)$$

Then, at step 250, a cooling operation is performed according to the correction value TAOa of the target air temperature TAO. Specifically, a blowing amount of the blower is determined based on the correction value TAOa of the target temperature TAO and is output to the driving circuit 150 as driving voltage. Therefore, the blower is driven by the driving circuit 150, and air is blown into the evaporator by the blower. The evaporator cools the air blown from the blower, and the cooled air flows into the air duct D as a cool air flow. Thus, cool air is blown from each face air outlet of the two blowing side duct portions 32 and 33 of the air duct D according to the correction value TAOa of the target temperature TAO. As a result, a pleasant cool feeling is given to a passenger seated on the rear seat in the passenger compartment.

Although the present invention has been fully described in connection with preferred embodiments thereof with reference to the accompanying drawings, it is to be noted that various changes and modifications will become apparent to those skilled in the art.

For example, in the above-described embodiments, the present invention is applied to the inside air temperature sensor 40; however, the present invention may be applied to a sensor, for detecting a state in the passenger compartment, such as a humidity sensor for detecting a humidity in the passenger compartment, a $CO_2$ sensor for detecting an amount of $CO_2$, a CO or $O_2$ sensor for detecting an amount of CO or $O_2$. In this case, the each sensor may be disposed in the connection duct portion 31 of the air duct D, similarly to the inside air temperature sensor 40.

In the above-described embodiments, the inside air temperature sensor 40 is disposed in the side wall portion of the passenger compartment at a center of the connection duct portion of the air duct D. However, the inside air temperature sensor 40 and the other sensors may be disposed in the side wall portion of the passenger compartment at the other portion of the air duct D.

Further, the air duct D in which the inside air temperature sensor 40 and the other sensors for a vehicle are held may be mounted on a vehicle such as a many kinds of buses and cars.

Such changes and modifications are to be understood as being within the scope of the present invention as defined by the appended claims.

What is claimed is:

1. An arrangement structure of a sensor for detecting a physical amount in a passenger compartment of a vehicle having a space between an outer plate of the vehicle and an inner wall of a passenger compartment of the vehicle, said structure comprising:

an air duct disposed in said space to form a gap between said inner wall of the passenger compartment and said air duct, wherein:

said inner wall of the passenger compartment has a communication portion for communicating the passenger compartment with said gap; and said sensor is disposed in said gap to detect the physical amount of the passenger compartment through said communication portion.

2. The arrangement structure of said sensor according to claim 1, further comprising:

a first heat-insulating member disposed between said outer plate and said air duct.

3. The arrangement structure of said sensor according to claim 2, further comprising:

a second heat-insulating member disposed between said inner wall of the passenger compartment and said duct.

4. The arrangement structure of said sensor according to claim 1, wherein:

said air duct includes a main air passage through which air mainly flows and a branch air passage branched from said main air passage at a side of said gap to form a negative pressure in said branch air passage relative to said main air passage.

5. The arrangement structure of said sensor according to claim 4, further comprising:

a communication member for communicating said gap with said branch air passage, said communication member having a first opened end disposed in said gap and a second opened end disposed in said branch air passage, wherein said sensor is disposed in said gap at a position proximate to said first opened end of said communication member.

6. The arrangement structure of said sensor according to claim 5, further comprising:

a check valve, for preventing an air flow from said branch air passage to said gap, disposed at said second opened end, wherein said communication member is disposed in such a manner that said second opened end of said communication member is opened toward a downstream air side of said branch air passage at a position where the negative pressure is generated in said branch air passage.

7. The arrangement structure of said sensor according to claim 1, wherein:

said communication portion is provided in said inner wall of the passenger compartment at a rear seat side of the passenger compartment; and said sensor is a rear seat side temperature sensor for detecting a temperature in the passenger compartment at a rear seat side.

8. The arrangement structure of said sensor according to claim 1, wherein said gap is provided in an a ceiling of the vehicle at a rear seat side.

9. The arrangement structure of said sensor according to claim 7, further comprising:

a cooling unit for cooling air to be introduced into said air duct;

target temperature control means for controlling a target temperature of air to be blown out from said air duct to the passenger compartment; and temperature correction means for correcting a temperature detected by said temperature sensor according to the target temperature of air to have a correction amount.

10. The arrangement structure of said sensor according to claim 9, further comprising:

target temperature correction means for correcting the target temperature of air according to the target temperature and the correction amount.

11. The arrangement structure of said sensor according to claim 9, wherein the correction amount and the target temperature have a relationship in which the correction amount is increased at a negative side according to an increase of the target temperature and is increased at a positive side according to a decrease of the target temperature.

12. A detecting device for a vehicle having a space between an outer plate of the vehicle and an inner wall of a passenger compartment of the vehicle, said inner wall having a communication portion for communicating the passenger compartment with said space, said device comprising:

an air duct disposed in said space to form a gap between said inner wall of the passenger compartment and said air duct at a position proximate to said communication portion; and a physical amount detecting sensor for detecting a physical amount in the passenger compartment, wherein:

said physical amount detecting sensor is disposed in said gap to detect the physical amount in the passenger compartment through said communication portion.

13. The detecting device according to claim 12, wherein:

said air duct includes a main air passage through which air mainly flows and a branch air passage branched from said main air passage at a side of said gap to form a negative pressure in said branch air passage relative to said main air passage.

14. The detecting device according to claim 13, further comprising:

a communication member for communicating said gap with said branch air passage, said communication member having a first opened end disposed in said gap and a second opened end disposed in said branch air passage, wherein said sensor is disposed in said gap at a position proximate to said first opened end of said communication member.

15. The detecting device according to claim 14, further comprising:

a check valve, for preventing an air flow from said branch air passage to said gap, disposed at said second opened end, wherein said communication member is disposed in such a manner that said second opened end of said communication member is opened toward a downstream air side of said branch air passage at a position where the negative pressure is generated in said branch air passage.

16. The detecting device according to claim 12, wherein said physical amount detecting sensor is a temperature sensor for detecting a physical amount in the passenger compartment.

17. The detecting device according to claim 16, further comprising:

cooling means for cooling air to be introduced into said air duct;

target temperature control means for controlling a target temperature of air to be blown out from said air duct to the passenger compartment; and temperature correction means for correcting a temperature detected by said temperature sensor according to the target temperature of air.

* * * * *